US007008508B2

(12) United States Patent
Doi et al.

(10) Patent No.: US 7,008,508 B2
(45) Date of Patent: Mar. 7, 2006

(54) COMPOSITION FOR INCREASING WET STRENGTH OF PAPER INCLUDING WATER-SOLUBLE BLOCKED URETHANE PREPOLYMERS

(75) Inventors: Takeshi Doi, Oumihachiman (JP); Takeshi Miyamura, Kameoka (JP); Masahiro Kouchi, Nara (JP)

(73) Assignee: Dai Ichi Kogyo Seiyaku Co., Kyoto (JP)

( * ) Notice: Subject to any disclaimer, the term of this patent is extended or adjusted under 35 U.S.C. 154(b) by 393 days.

(21) Appl. No.: 10/197,330

(22) Filed: Jul. 18, 2002

(65) Prior Publication Data

US 2003/0083427 A1 May 1, 2003

(30) Foreign Application Priority Data

Oct. 31, 2001 (JP) ............................. 2001-333827

(51) Int. Cl.
  *D21H 17/57* (2006.01)
  *D21H 21/20* (2006.01)
  *C08L 75/04* (2006.01)
(52) U.S. Cl. .................. 162/164.6; 162/165; 162/158; 162/179; 528/45; 524/589; 524/590; 524/591
(58) Field of Classification Search ................. 528/45; 524/589–591; 162/154, 168.1, 168.2, 164.6, 162/164.1, 165, 135–136, 169, 179; 427/361, 427/391
See application file for complete search history.

(56) References Cited

U.S. PATENT DOCUMENTS

| 3,238,010 | A | * | 3/1966 | Habib et al. .................. 8/115.6 |
| 3,346,445 | A | * | 10/1967 | Gay ............................ 162/136 |
| 3,519,478 | A | * | 7/1970 | Howell, Jr. .................. 427/391 |
| 3,583,943 | A | * | 6/1971 | Howell ......................... 528/45 |
| 3,627,719 | A | * | 12/1971 | Sellet .......................... 524/315 |
| 3,694,389 | A | * | 9/1972 | Levy ........................... 524/765 |
| 3,773,729 | A | * | 11/1973 | Wakimoto et al. ............ 528/45 |
| 3,833,525 | A | * | 9/1974 | Orlando et al. .............. 521/128 |
| 3,971,764 | A | * | 7/1976 | Schurmann et al. .......... 528/65 |
| 4,239,878 | A | * | 12/1980 | Kobayashi et al. ........... 528/45 |
| 4,433,017 | A | * | 2/1984 | Goto et al. ................... 528/45 |
| 5,013,838 | A | * | 5/1991 | Scholl ......................... 544/193 |
| 5,503,714 | A | * | 4/1996 | Reiners et al. ........... 162/164.6 |
| 5,696,291 | A | * | 12/1997 | Bechara et al. ............. 564/292 |
| 5,738,912 | A | * | 4/1998 | Konig et al. ................. 427/389 |
| 6,143,132 | A | * | 11/2000 | Traubel et al. .............. 162/158 |
| 6,488,813 | B1 | | 12/2002 | Doi et al. ................. 162/164.6 |

FOREIGN PATENT DOCUMENTS

| EP | 17598 A1 | * | 10/1980 |
| GB | 2068034 A | * | 8/1981 |
| GB | 2093491 A | * | 9/1982 |
| JP | 05051896 A | * | 3/1993 |

\* cited by examiner

*Primary Examiner*—José A. Fortuna
(74) *Attorney, Agent, or Firm*—Millen, White, Zelano & Branigan, P.C.

(57) ABSTRACT

For use as a wet strength agent, a water-soluble blocked urethane prepolymer having a hydrophilic group and a blocked isocyanate group is combined with a cationic charge-adjusting agent. The adsorption and retention of the water-soluble blocked urethane prepolymer to cellulosic fiber are promoted by virtue of the cationic charge adjusting agent when the wet strength agent is added to a paper-making stock.

16 Claims, No Drawings

COMPOSITION FOR INCREASING WET STRENGTH OF PAPER INCLUDING WATER-SOLUBLE BLOCKED URETHANE PREPOLYMERS

FIELD OF THE INVENTION

This invention relates to the use of blocked urethane prepolymers as wet strength agent to be added to the stock to obtain paper with increased strength in the wet state. It also relates to a process for making paper with increased wet strength including the addition of a blocked urethane prepolymer to the stock.

BACKGROUND OF THE INVENTION

Paper comprises, in addition to cellulose fiber, a variety of additives such as fillers, strength agents and the like. Wet strength agents are an additive which gives paper having increased strength in the wet state. Examples of widely used wet strength agents include urea resins, melamine resins, dialdehyde starch, polyethyleneimine, epoxylated polyamide etc.

Recently, several attempts have been made to use polyurethanes and urethane prepolymers as wet strength agent. JP-A-06173196 discloses use of a urethane prepolymer containing tertiary amine or quaternary ammonium moieties without blocking the free isocyanate groups. The prepolymer is either added into the stock or applied to webs formed therefrom in the form of an aqueous dispersion or emulsion. GB 2068034A discloses use of a urethane prepolymer amine salt as wet strength agent. The prepolymer amine salt is produced by blocking a urethane prepolymer having free isocyanate groups with a ketoxime, and reacting the blocked urethane prepolymer with a polyfunctional amine to give amine containing-blocked urethane prepolymer followed by dissolving the reaction product in water in the form of an acid addition salt. This amine salt is either added to the stock or applied to a web formed therefrom. JP-A-05051896 discloses a wet strength agent of the type to be applied to a web or paper. The agent comprises a water-soluble urethane prepolymer blocked with sodium hydrogen sulfite or a water soluble urethane prepolymer blocked with ketoxime or other blocking agent which is solubilized by introducing a hydrophilic moiety using the reaction with dimethylolpropionic acid.

Urethane prepolymers containing free isocyanate groups are generally unstable in the presence of water. Blocked urethane prepolymers, on other hand, require heating for unblocking. For blocked urethane prepolymers to be added in the stock, it is imperative to be unblocked under conditions to be encountered in the dryer part of paper making machines, typically at a temperature of up to 130° C. for several minutes. For a wet strength agent to be added in the stock, it is important to be adsorbed to and retained by cellulosic fiber in the stock.

Accordingly, a need exists for a wet strength composition of the type to be added to the paper making stock which contains a water-soluble blocked urethane prepolymer capable of unblocking under conditions to be normally encountered in the dryer part of paper making machines and which may be adsorbed to and retained by cellulosic fiber in the stock to the greatest extent as possible.

SUMMARY OF THE INVENTION

The present invention provides a composition for increasing wet strength of paper comprising (a) a water-soluble blocked urethane prepolymer having a hydrophilic group and a blocked isocyanate group capable of thermally unblocking into a free isocyanate group, and (b) a cationic compound or polymer for promoting adsorption and retention of the water-soluble blocked urethane prepolymer to cellulosic fiber.

In a preferred embodiment of the present invention, said blocked urethane prepolymer has been blocked with a substituted phenol having an electron-attracting group such as trifluoromethyl, nitro, cyano, acetyl, carboxyl, alkoxycarbonyl or alkylsulfonyl at the ortho- or para-position. Use of a phenol derivative having an electron-attracting substituent at the ortho- or para-position allows unblocking of the blocked urethane prepolymer under conditions which are normally encountered in the drying part of conventional or existing paper making machines. Advantageously, the phenol derivative blocking agent is p-hydroxybenzoic acid, an ester thereof, salicylic acid or an ester thereof. Both p-hydroxybenzoates and salicylates have been approval as a preservative for foods, beverages cosmetics and pharmaceutical preparations due to their safety for human beings. Accordingly, there is little safety concern if they are produced by the unblocking reaction of the blocked urethane prepolymer and then retained in paper or in the effluent from paper mills.

In a preferred embodiment of the present invention, said cationic compound or polymer is chosen from the group consisting of a quaternary ammonium or pyridinium salt having a long-chain aliphatic hydrocarbon group, a water-soluble polyurethane having a quaternary ammonium group, and a dicyandiamide-polyalkylenepolyamine-formaldehyde condensate. Cellulosic fiber suspended in the stock is generally charged to negative. The cationic compound or polymer enhances, when combined with the water-soluble blocked urethane prepolymer, the positive charge of the blocked urethane prepolymer and promotes its adsorption to and retention by the fiber electrochemically. Increased retention of the urethane prepolymer, in turn, not only allows the amount of wet strength composition required for achieving a desired level of strength to be decreased but contributes to reduction of load to the white water treating system.

In another aspect, the present invention provides a process for making paper with increased wet strength. The process comprises adding the wet strength composition according to the present invention to a paper making stock, forming a web from the stock, and drying the web under such conditions that the blocked urethane prepolymer is thermally unblocked.

DETAILED DISCUSSION

A method for preparing a water-soluble blocked urethane prepolymer having a hydrophilic group and a blocked isocyanate group capable of thermally unblocking into a free isocyanate group is disclosed in JP-A-2002/115198 assigned to the assignee of the present application, the entire disclosure of which is incorporated herein by reference. The method may be advantageously employed to prepare the blocked urethane prepolymer component of the composition of present invention.

As is well-known in the art, urethane prepolymers are produced by reacting a polyisocyanate with a polyether or polyester polyol at an NCO/OH equivalent ratio greater than 1. Examples of the starting polyether polyols, polyester polyols and polyisocyanates are all well-known in the polyurethane industry. Any of known materials may be used in the present invention.

Examples of preferred polyols include polyether polyols and polyester polyols having a molecular weight from 1,000 to 50,000.

Polyether polyols having three or more functionalities may be prepared starting from a trihydric alcohol such as glycerine, hexanetriol, trimethylolethane or trimethylolpropane, a trihydric alkanolamine such as triethanolamine, tripropanolamine or tributanolamine, or tetrahydric alcohol such as pentaerythritol. The polyether polyol may be produced by the addition-polymerization of an alkylene oxide such as ethylene oxide, propylene oxide or butylene oxide to the starting polyhydric alcohol in the presence of a basic catalyst.

Polyester polyols are generally produced by reacting a dihydric alcohol with a dicarboxylic acid or its acid hydride. Examples of dihydric alcohols include aliphatic and alicyclic diols such as ethylene glycol, diethylene glycol, triethylene glycol, propylene glycol, 1,4-butanediol, 1,5-pentanediol, neopentyl glycol, 1,6-hexanediol, 3-methyl-1,5-pentanediol or cyclohexanediol. Also included in usable glycols are an alkylene oxide addition product of a bisphenol such as bisphenol A, bisphenol F or bisphenol S. Examples of dicarboxylic acids and acid anhydrides include saturated or unsaturated aliphatic dicarboxylic acids and aromatic dicarboxylic acids such as oxalic acid, malonic acid, succinic acid and anhydride, glutaric acid, adipic acid, sebacic acid, maleic acid and anhydride, fumaric acid, phthalic acid and anhydride, isophthalic acid or terephthalic acid. Ring opening polymerization products of a lactone such as ε-caprolactone or a cyclic carbonate such as trimethylenecarbonate are also included in the class of polyester polyols. Polyester polyols are generally difunctional. Polyester polyols having a functionality greater than two may be produced by incorporating a polyhydric alcohol having a functionality greater than two or a polycarboxylic acid having a functionality greater than two such as trimellitic anhydride into the glycol or dicarboxylic component.

Urethane prepolymers may be produced by reacting the above polyether polyol or polyester polyol with a polycyanate at an NCO/OH equivalent ratio greater than 1. Any polyisocyanate compound may be used. Examples thereof include tolylenediisocyanate (TDI). diphenylmethanediisocyanate (MDI), polymeric MDI, hexamethylenediisocyanate (HMDI), xylylenediisocyanate (XDI), tetramethylxylylenediisocyanate (TMXDI), isophoronediisocyanate (IPDI) and hydrogenated MDI. A non-yellowing diisocyanate such as HMDI, IPDI, XDI, TMXDI or hydrogenated MDI may be used when non-yellowing property is desired.

A first method for introducing a hydrophilic group into the blocked urethane prepolymer comprises the steps of reacting a portion of free isocyanate groups in the urethane prepolymer produced from a polymer polyol component and a polyisocyanate component with a hydrophilic group-introducing active hydrogen compound (hydrophilic group precursor), and then blocking the remaining free isocyanate groups with a blocking agent.

The first method is suitable when the polymer polyol component is a polyether polyol having a functionality greater than two. The urethane prepolymer must have a free isocyanate content of at least 2% by weight and preferably from 5 to 10% by weight. A portion of the free isocyanate content is consumed by the reaction with the hydrophilic group-introducing active hydrogen compound. A number of such active hydrogen compounds are disclosed in JP-A-06017196, GB 2068034A and JP-A-05051896 cited above. Any of disclosed active hydrogen compounds may be used in the present invention. However, preference is made to an aliphatic active hydrogen compound having a tertiary amino group and an active hydrogen-containing group such as hydroxyl or primary amino group. Typical examples thereof are N,N-dimethyldiethanolamine, N,N-dimethylethylenediamine or their homologs. Dihydric tertiary aminoalcohols are preferable. The hydrophilic precursor compound is bound to the urethane prepolymer by the reaction between the active hydrogen-containing group thereof and a portion of the free isocyante groups of the urethane prepolymer. The remainder of free isocyanate groups is then blocked with a blocking agent disclosed herein. The water-soluble blocked urethane prepolymer is prepared by quaternization of bound tertiary amino group with a quaternizing agent such as dimethyl sulfate. Alternatively, the bound tertiary amino group may be neutralized with a suitable acid to solubilize the blocked urethane in the form of an acid addition salt. Solubilization in the form of a quaternary ammonium salt is preferable. This is because it does not need for an acid for solubilization and, therefore, the stock may be prepared in neutral to basic regions.

The ratio of the hydrophilic group-introducing active compound to the urethane prepolymer must be sufficient to render the urethane prepolymer water-soluble but not sufficient to block all of free isocyanate groups in order that at least a portion of free isocyanate groups remain unreacted. This ratio naturally varies depending on the nature of the starting polyol and polyisocyanate components of the urethane prepolymer and also on the type of a particular hydrophilic group-introducing active hydrogen compound employed. This ratio generally lies between 10% and 50% equivalents relative to the free isocyanate content of the urethane prepolymer.

The balance of free isocyanate content of the urethane prepolymer is blocked with a phenolic compound having an electron-attracting substituent at the ortho- or para-position. A phenolic compound having an amino group at the designated position is excluded from the blocking agent to be used in the present invention. This is because amino group irreversibly forms a urea linkage by the reaction with a free isocyanate group and this reaction is not regarded as "blocking". Phenols having an electron-attracting group such as trifluoromethyl, nitro, cyano, acetyl, alkoxycarbonyl, carboxyl or alkylsulfonyl group at the designated position may be used. Examples of most preferable electron-attracting groups include free or esterified carboxyl group. Examples of specific compounds having such electron-attracting groups are p-hydroxybenzoic acid, esters thereof, salicylic acid and esters thereof. They are used in foods, cosmetics or pharmaceutical preparations as a preservative or analgesic due to safety to human beings and the environment. Accordingly, safety concern is minimum if the preferred blocking agent remains in paper or is contained in the effluent from the paper mill.

A second method for introducing a hydrophilic group into the blocked urethane prepolymer employs a polyhydric alcohol having a tertiary amino group as a portion of the polyol component in the synthesis of the urethane prepolymer. Examples of suitable tertiary amino alcohols include N-methyldiethanolamine, N-ethyldiethanolamine and like N-alkyldialkanolamines. Triethanolamine could also be used. This method is especially suited where a polyester polyol is used as the polyol component in the synthesis of the urethane prepolymer. If the polyol component comprises a bifunctional tertiary amino alcohol and a bifunctional polyester polyol, then a urethane prepolymer having a functionality greater than two may be produced by incorporating into the reaction system a low molecular weight polyhydric alcohol having a functionality greater than two such as glycerine or trimethylolpropane. In this case, the NCO/OH equivalent ratio of the polyisocyanate component must be excess of 1 relative to the sum of OH groups possessed by the polyester polyol, polyfunctional tertiary amino alcohol and the low molecular weight polyhydric alcohol having a functionality greater than two so that the resulting urethane prepolymer has a free isocyanate group content from 0.5 to 8% by weight, preferably from 2 to 6% by weight.

All of free isocyanate groups of the resulting urethane prepolymer having a hydrophilic group or a precursor group thereof are blocked with the blocking agent mentioned above with regard to the first method and then the precursor group (tertiary amino group) is quaternized with a quaternizing agent such as dimethyl sulfate or neutralized with a suitable acid as in the first method to give a water-soluble blocked urethane prepolymer having a hydrophilic group and a blocked isocyanate group.

Ortho- or para-substituted phenols as describe above may be employed for reversibly blocking a water-soluble urethane prepolymer to produce a wet strength agent of the type to be added to a paper making stock. For other applications where the unblocking conditions are not limited by the dryer part of conventional paper making machines, such as where the wet strength agent is applied onto ready made paper or webs, other blocking agents may also be used. Examples thereof include imidazole and derivatives thereof such as 2-methylimidazole, 2-ethylimidazole, 2-methyl-4-ethylimidazole, 2-undecylimidazole, 2-phenylimidazole or 2-phenyl-4-methylimidazole, oximes such as 2-butanone oxime.

The reaction of a polymer polyol and a polycyanate at an excessive NCO/OH ratio to produce a urethane prepolymer is well-known in the art. The reaction is usually carried out in the absence of any solvent. However, a water-miscible solvent free of active hydrogen atom such as dioxane, methyl ethyl ketone, dimethylformamide, tetrahydrofuran, N-methyl-2-pyrrolidone or propylene glycol methyl ether acetate may be employed in the reaction in cases where the reaction system becomes too viscous. Such solvents are useful as a solvent when adding an antioxidant such as hindered phenol or semicarbazide antioxidants or a photostabilizer such as hindered amine, benzophenone or benzotriazole photostabilizers to the wet strength composition of the present invention as a solution or emulsion.

The wet strength composition according to the present invention comprises the above described water-soluble blocked urethane prepolymer and a cationic compound or polymer in combination to improve the adsorption and retention of the blocked urethane prepolymer by cellulosic fiber. When combined, the cationic compound or polymer enables an amount of the urethane prepolymer necessary for achieving the same level of wet strength to be substantially decreased compared with the urethane prepolymer alone.

Compounds or polymers useful for the above purpose must have a group or moiety capable of ionizing into a cation in an aqueous solution. There are several classes of useful cationic compounds or polymers. One preferred class is a quaternary ammonium or pyridinium salt having a long-chain aliphatic hydrocarbon group such as octyl, decyl, lauryl, myristyl, hexadecyl or octadecyl. Such ammonium or pyridinium salts having a chloride or bromide counter ion are known as a cationic surfactant or germicide.

Since the presence of halide ions and chloride ions in particular in waste liquid makes it difficult to treat the waste liquid in the paper making industry, a quaternary ammonium or pyridinium salt having a non-halide counter ion such as octyltriethylammonium ethoxysulfate, lauryltriethylammonium ethoxysulfate or laurylpyridinium ethoxysulfate is preferred.

Another class of preferred cationic compounds or polymers is a water-soluble polyurethane having a quaternary ammonium group in the molecule. Water-soluble polyurethanes having a quaternary ammonium group can be produced by a method similar to the above described first or second method for producing a urethane prepolymer having a hydrophilic group and a blocked isocyanate group with certain modification. As in the first method, a hydrophilic group is introduced in the urethane prepolymer by reacting a portion of free isocyanate groups with an active hydrogen-containing precursor such as tertiary aminoalcohols. After quaternizing the tertiary amino group with a quaternizing agent such as dimethyl sulfate or diethyl sulfate, the remaining free isocyanate groups are reacted with water for chain extending or crosslinking. Alternatively, a urethane prepolymer having a functionality greater than two is produced, as in the second method, by reacting a mixture of a bifunctional tertiary aminoalcohol, a bifunctional polyester polyol and a low molecular weight polyhydric alcohol having three or more functionalities with a polyisocyanate at an NCO/OH, equivalents ratio greater than 1. After quaternizing the tertiary amino group with a non-halide quaternizing agent, the urethane prepolymer is chain extended or crosslinked by the reaction with water as above.

A further class of preferred cationic compounds or polymers is a dicyandiamide-polyalkylenepolyamine-formaldehyde condensate, e.g. dicyandiamide-diethylenetriamine-formaldehyde condensate. This type of condensates contain many methylolated secondary and/or tertiary amino groups and function not only as a charge adjusting agent but also as a wet strength agent like urea or melamine resins.

The charge-adjusting cationic compound or polymer may be combined with the water-soluble block urethane prepolymer at a proportion from 1 to 10% by weight as solids relative to the urethane prepolymer.

The wet strength composition of the present invention is added to the stock together with other additives such as filler. The stock is then processed, as in the conventional paper making process, through the wire section, the press section and the dryer section to give paper having increased wet strength. The paper is dried by passing a series of cylinders which are heated usually to a maximum temperature up to 130° C. The water-soluble blocked urethane prepolymer of the present invention may be fully unblocked under the above heating conditions to regenerate reactive urethane prepolymer in situ which serves as binder to strengthen the binding of fibers. The wet strength composition could also find use as wet strength agent to be applied onto ready-made paper or webs as in the case of sizing agent.

The amount of the wet strength composition of the present invention to be added to paper may vary depending on the desired strength property in the finished paper and generally ranges from 0.05% to 2% by weight as solids based on dry weight of fiber (pulp). This amount may be increased in excess of 2% by weight where higher wet strength is desirable.

EXAMPLES

The following examples illustrate the present invention without limiting thereto. All parts and percents therein are by weight unless otherwise indicated.

Example 1

300 parts of polyether polyol having an average molecular weight of 3,000 prepared by random addition of ethylene oxide (EO) and propylene oxide (PO) at 70:30 to glycerine and 50.4 parts of hexamethylenediisocyanate (HMDI) were reacted at 100° C. for 150 minutes to give a urethane prepolymer having a free isocyanate content of 4%. The reaction product was cooled down to 70° C. and 8.9 parts of N,N-dimethylethanolamine were added thereto. The mixture was kept at 70° C. for 100 minutes with stirring whereupon the free isocyanate content decreased to 2.5%. The reaction mixture was further cooled down to 50° C. and 29.5 parts of p-hydroxybenzoic acid were added thereto. After the addition, the mixture was allowed to react at an inner temperature of 70° C. for 120 minutes.

After confirming the absence of free isocyanate content, the reaction product was quaternized with 12.6 parts of dimethyl sulfate at 55° C. for 30 minutes and then combined with 12.6 parts of lauryltriethylammonium ethoxysulfate followed by dilution with 1560 parts of water. A clear, viscous solution of thermally reactive blocked urethane prepolymer solution containing 20% solids hereinafter referred to as "Solution A" was obtained.

Example 2

300 parts of polyether polyol having an average molecular weight of 3,000 produced by addition reacting EO and PO at 70:30 to glycerine were blended with 100 parts of hydroxy-terminated polyhexylene adipate (MW=1,000). The blend was reacted with 67.2 parts of HMDI at 100° C. for 2 hours to obtain a urethane prepolymer having a free isocyanate content of 3%. The reaction product was cooled down to 70° C. and 8.9 parts of N,N-dimethylethanolamine were added thereto. The mixture was allowed to react at 70° C. for 100 minutes whereupon the free isocyanate content decreased to 1.8%. The reaction mixture was further cooled down to 50° C. and 41.5 parts of butyl p-hydroxybenzoate were added thereto. Then the mixture was allowed to react at an inner temperature of 70° C. for 120 minutes. After confirming the absence of free isocyante content, the reaction product was quaternized with 15.4 parts of diethyl sulfate at 55° C. for 30 minutes and combined with 43 parts of lauryltriethylammonium ethoxysulfate followed by dilution with 1690 parts of water. A clear, viscous solution of thermally reactive blocked urethane prepolymer solution containing 20% solids hereinafter referred to as "Solution B" was obtained.

Example 3

300 parts of polyether polyol (MW=3,000) produced by addition reacting EO and PO at 10:90 to trimethylolpropane and 50.4 parts of HMDI were reacted at 100° C. for 2 hours to give a urethane prepolymer having a free isocyanate content of 4%. The reaction product was cooled down to 70° C. and 8.9 parts of N,N-dimethylethanolamine were added thereto. The mixture was allowed to react at 70° C. for 100 minutes whereupon the free isocyanate content decreased to 1.2%. The reaction mixture was cooled down again to 50° C. and 15 parts of p-hydroxybenzoic acid were added thereto. The inner temperature was raised to 70° C. and the reaction was continued for 120 minutes. After confirming the absence of free isocyanate content, the reaction product was reacted with 15.4 parts of diethyl sulfate at 55° C. for 30 minutes and combined with 39 parts of dicyandiamide-diethylenetriamine-formaldehyde polycondensate (MW=5,000) followed by dilution with 1520 parts of water. A clear, viscous solution of thermally reactive blocked urethane prepolymer containing 20% solids hereinafter referred to as "Solution C" was obtained.

Example 4

A blend of 100 parts of polyester polyol (MW=1,000) produced from 3-methyl-1,5-pentanediol and terephthalic acid, 6.7 parts of trimethylolpropane and 21 parts of N-methyldiethanolamine was reacted with 79 parts of HMDI at 65° C. for 120 minutes to give a urethane prepolymer having a free isocyanate content of 5.0%. The reaction product was cooled down to 50° C. and 51 parts of p-hydroxybenzoic acid were added thereto. The mixture was allowed to react at an inner temperature of 70° C. for 120 minutes. After confirming the absence of free isocyanate content, the reaction product was quaternized with 22.2 parts of diethyl sulfate by reacting at 55° C. for 30 minutes followed by combining 13 parts of octyltriethylammonium ethoxysulfate. Dilution of the mixture with 1,020 parts of water gave a clear, viscous solution of blocked urethane prepolymer containing 20% solids hereinafter referred to as "Solution D."

Example 5

A blend of 200 parts of polyester polyol (MW=1,000) produced from maleic acid and bisphenol A/EO (2 moles) adduct, 5 parts of trimethylolpropane and 20 parts of N-methyldiethanolamine was reacted with 96 parts of HMDI at 65° C. for 120 minutes to give a urethane prepolymer having a free isocyanate content of 3.6%. The reaction product was cooled down to 30° C. and 55 parts of butyl p-hydroxybenzoate were added thereto. The mixture was allowed to react at 60° C. for 90 minutes. After confirming the absence of free isocyanate content, the reaction product was quaternized with 46.2 parts of dimethyl sulfate by reacting at 55° C. for 30 minutes followed by combining 42 parts of dicyandiamide-diethylenetriamine-formaldehyde polycondensate (MW=5,000). Dilution of the mixture with 1,650 parts of water gave a clear, viscous solution of thermally reactive urethane prepolymer containing 20% solids hereinafter referred to as "Solution E."

Example 6

Part 1

300 parts of polyester polyol (MW=1,500) produced from 3-methyl-1,5-pentanediol and terephthalic acid were reacted with 100.8 parts of HMDI at 100° C. for 2 hours to give a urethane prepolymer having a free isocyanate content of 8.4%. The prepolymer was cooled down to 50° C. and 35.7 parts of N-methyldiethanolamine were added thereto. The mixture was stirred at 65° C. for 60 minutes whereupon the free isocyanate content decreased to 2.0%. After cooling to 50° C., the reaction product was quaternized with 37.8 parts of dimethyl sulfate by reacting at 50° C. for 20 minutes followed by diluting with 1,897 parts of water. A viscous solution of cationic polyurethane containing 25% solids was obtained.

Part 2

A blend of 200 parts of polyester polyol (MW=1,000) produced from 1,4-butanediol and adipic acid, 5 parts of trimethylolpropane and 20 parts of N-methyldiethanolamine was reacted with 96 parts of HMDI at 50° C. for 120 minutes to give a urethane prepolymer having a free isocyanate content of 3.6%. The reaction product was cooled down to 30° C. and 55 parts of butyl p-hydroxybenzoate were added thereto. The mixture was allowed to react at 60° C. for 90 minutes. After confirming the absence of free isocyante content, the reaction product was neutralized with 87.5 parts of 20% aqueous solution of malonic acid. To this were added 79 parts of the cationic polyurethane solution produced in Part 1 and 1,420 parts of water. A clear, viscous solution of thermally reactive blocked urethane containing 20% solids hereinafter referred to as "Solution F" was obtained.

Comparative Example 1

300 parts of polyether polyol having an average molecular weight of 3,000 prepared by random, addition of ethylene oxide and propylene oxide at 70:30 to glycerine and 50.4 parts of hexamethylenediisocyanate were reacted at 100° C. for 150 minutes to give a urethane prepolymer having a free isocyanate content of 4%. The reaction product was cooled down to 70° C. and 8.9 parts of N,N-dimethylethanolamine were added thereto. The mixture was kept at 70° C. for 100 minutes with stirring whereupon the free isocyanate content decreased to 2.5%. The reaction mixture was further cooled down to 50° C. and 20 parts of phenol were added thereto. After the addition, the mixture was allowed to react at an inner temperature of 80° C. for 120 minutes.

After confirming the absence of free isocyanate content, the reaction product was quaternized with 12.6 parts of dimethyl sulfate at 70° C. for 180 minutes followed by dilution with 1570 parts of water. A clear, viscous solution of thermally reactive blocked urethane prepolymer containing 20% solids hereinafter referred to as "Solution G" was obtained.

Comparative Example 2

A blend of 200 parts of bifunctional polyether polyol (MW=1,000) having an EO:PO ratio of 10:90, 5 parts of trimethylpropane and 20 parts of N-methyldiethanolamine was reacted with 96 parts of HMDI at 50° C. for 120 minutes to give a urethane prepolymer having a free isocyanate content of 3.6%. The prepolymer was then cooled down to 30° C. and 55 parts of butyl p-hydroxybenzoate were added thereto. After the addition, the mixture was allowed to react at 60° C. for 90 minutes. After confirming the absence of free isocyanate content, the product was quaternized with 46.2 parts of dimethyl sulfate by reacting at 55° C. for 30 minutes followed by diluting with 1,690 parts of water. A clear, viscous solution of thermally reactive blocked urethane prepolymer containing 20% solids hereafter referred to as "Solution H" was obtained.

Comparative Example 3

100 parts of glycerine/PO adduct (MW=3,000) were reacted with 16.8 parts of HMDI at 100° C. for 2 hours to give a urethane prepolymer having a free isocyanate content of 3.6%. Then 40.5 parts of 30% aqueous solution of sodium hydrogen sulfite were added to the prepolymer and allowed to react at 40° C. for 60 minutes with stirring. A semi-transparent, viscous solution of bisulfite-blocked urethane prepolymer containing 20% solids hereinafter referred to as "Solution I" was obtained by diluting the bisulfite-blocked prepolymer with 427 parts of water.

Comparative Example 4

Example 1 was followed up to the step of reacting the urethane prepolymer with N,N-dimethylethanolamine. To the reaction product having a free isocyanate content of 2.5% were added 12.6 parts of dimethyl sulfate while keeping the inner temperature at 50° C. and the mixture was allowed to react at 70° C. for 180 minutes. The quaternized urethane prepolymer was diluted with 1,570 parts of water and then crosslinked with 6.4 parts of ethylenediamine. An aqueous solution of water-soluble polyurethane containing 20% solids hereinafter referred to as "Solution J" was obtained.

Paper Making Test:

The paper making test was carried out according to JIS P 8209-1961 as follows.

135.3 g of NBKP (Needle-leaved Bleached Kraft Pulp) was shredded into about 3 cm square pieces and soaked in 1668.7 g of water overnight, and beated in a standard beater for 3 hours to a Canadian standard freeness of 527 ml (20° C., 0.3%) to obtain a pulp slurry of 7.5% concentration. 400 g of this slurry, 1.0 g of a nonionic antifoaming agent (ANTIFROTH F-120), 5.0 g of 0.1% aqueous solution of polyethylene glycol 1,000,000 and 1,5 g of each of solutions of Examples and Comparative Examples adjusted to 2% solids (corresponding to 0.1% of dry pulp) were added to 593 g of water to prepare a stock having a pulp concentration of 3%.

32 g of the resulting stock was subjected to sheet making in a sheet machine, pressed in a press machine at a pressure of 3.5 g/m² for 5 minutes, air dried overnight at 20° C. at a relative humidity of 65%, and finally heat dried at 120° C. for 5 minutes to prepare sample paper of a basis weight of 50 g/m².

The sample paper was cut into 11 cm×1.5 size and attached to a standard autograph tensile test machine with clamp-to-clamp distance of 5 cm. The central area of the paper piece was wetted with water using a blush and tested for wet tensile strength.

In Comparative Example 5, 1.8 g of commercially available polyamide-epichlorohydrine based wet strength agent was added to the stock having a pulp concentration of 3% as a 5% aqueous dispersion (this amount corresponds to 0.3% by weight of dry pulp). The results are shown in the table below.

| Wet strength agent | % Addition Relative to the Weight of Dry Pulp | Wet Tensile Strength (kg/cm) |
|---|---|---|
| Solution A of Example 1 | 0.10 | 1.91 |
| Solution B of Example 2 | 0.10 | 1.951 |
| Solution C of Example 3 | 0.10 | 1.90 |
| Solution D of Example 4 | 0.10 | 2.05 |
| Solution E of Example 5 | 0.10 | 2.15 |
| Solution F of Example 6 | 0.10 | 2.18 |
| Solution G of Comp. Ex. 1 | 0.10 | 0.48 |
| Solution H of Comp. Ex. 2 | 0.10 | 1.10 |
| Solution I of Comp. Ex. 3 | 0.10 | 0.48 |
| Solution J of Comp. Ex. 4 | 0.10 | 0.51 |
| Comp. Example 5 | 0.30 | 1.85 |

It will be appreciated from the above table that the wet strength agents of the present invention are at least as effective as commercially available polyamide-epichlorohydrine based wet strength agent even at one third quantity of addition. Solution G and Solution I of Comparative Examples 1 and 3 respectively are, however, not effective to increase the wet strength of paper when added to the stock because the blocked urethane prepolymer components thereof are not unblocked under the above heating and drying conditions. Solution B of Comparative Example 2 free from a charge-adjusting component is not as effective as the wet strength agents of Examples 1–6 because the blocked urethane prepolymer component is not sufficiently adsorbed and retained on negatively charged cellulosic fiber. Solution J of Comparative Example 4 is not effective as a wet strength agent because the polyurethane does not have a thermally reversible blocked isocyanate group.

What is claimed is:

1. A composition for increasing the wet strength of paper comprising:
    (a) a water-soluble blocked urethane prepolymer having a hydrophilic group and a blocked isocyanate group capable of thermally unblocking;
    wherein the water-soluble blocked urethane prepolymer is produced by blocking a urethane prepolymer having a plurality of free isocyanate groups and at least one tertiary amino group with a phenolic compound having an electron-attracting group of trifluoromethyl, nitro, cyano, acetyl, alkoxycarbonyl, carboxyl or alkylsulfonyl at the ortho- or para-position followed by quaternizing or neutralizing the tertiary amino group, the water-soluble urethane prepolymer is free of a reversibly blocked isocyanate group other than those derived from the phenolic compound; and
    (b) a cationic compound or polymer effective for enhancing the cationic charge of the blocked urethane prepolymer in an aqueous solution.

2. The composition according to claim 1, wherein the phenolic compound is p-hydroxybenzoic acid, salicylic acid, or an ester of p-hydroxybenzoic acid or salicylic acid.

3. The composition according to claim 1, wherein the hydrophilic group is an acid-neutralized or quaternized tertiary amino group.

4. The composition according to claim 1, wherein the proportion of the cationic compound or polymer is 1–10% by weight of the water-soluble blocked urethane prepolymer as solids.

5. The composition according to claim 1, wherein the cationic compound or polymer is a quaternary ammonium or pyridinium salt having a long-chain aliphatic hydrocarbon group, a water-soluble polyurethane having a quaternary ammonium group or a water-soluble dicyandiamide-polyalkylenepolyamine-formaldehyde condensate.

6. The composition according to claim 1, wherein the cationic polymer is a reaction product of a urethane prepolymer having a quaternary ammonium group with water.

7. A composition according to claim 1, wherein the cationic compound or polymer is a quaternary ammonium or pyridinium salt having an octyl, a decyl, a lauryl, a myristyl, a hexadecyl or an octadecyl group, and a counter ion of chloride, bromide, octyltriethylammonium ethoxysulfate, lauryltriethylammonium ethoxysulfate or laurylpyridinium ethoxysulfate.

8. A composition according to claim 1, wherein the cationic compound or polymer is a quaternary ammonium or pyridinium salt having an octyl, a decyl, a lauryl, a myristyl, a hexadecyl or an octadecyl group, and a counter ion of octyltriethylammonium ethoxysulfate, lauryltriethylammonium ethoxysulfate or laurylpyridinium ethoxysulfate.

9. A composition according to claim 1, wherein the cationic compound or polymer is dicyandiamide-diethylenetriamine-formaldehyde condensate.

10. A composition according to claim 1, wherein the blocked isocyanate group is capable of unblocking at a temperature of up to 130° C.

11. A process for making paper with increased wet strength comprising:
    providing a paper-making stock comprising cellulosic fiber;
    adding to the stock a composition according to claim 1;
    forming a web from the stock; and
    drying the web at a temperature up to 130° C.

12. The process according to claim 11, wherein the phenolic compound of the composition is p-hydroxybenzoic acid, salicylic acid, or an ester of p-hydroxybenzoic acid or salicylic acid.

13. The process according to claim 11, wherein the hydrophilic group of the composition is an acid-neutralized or quaternized tertiary amino group.

14. The process according to claim 11, wherein the cationic compound or polymer of the composition is a quaternary ammonium or pyridinium salt having a long-chain aliphatic hydrocarbon group, a water-soluble polyurethane having a quaternary ammonium group, or a dicyandiamide-polyalkylenepolyamine-formaldehyde condensate.

15. The process according to claim 11, wherein the proportion of the cationic compound or polymer of the composition is 1–10% by weight of the water-soluble blocked urethane prepolymer as solids.

16. The process according to claim 11, wherein the composition is added to the stock in a combined amount of 0.05–2% by weight of fiber on a dry basis.

* * * * *